United States Patent
Huang (10) Patent No.: US 11,769,920 B2
(45) Date of Patent: Sep. 26, 2023

(54) BATTERY MODULE AND MANUFACTURING METHOD THEREOF

(71) Applicant: CONTEMPORARY AMPEREX TECHNOLOGY CO., LIMITED, Ningde (CN)

(72) Inventor: Aifang Huang, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 427 days.

(21) Appl. No.: 17/125,941

(22) Filed: Dec. 17, 2020

(65) Prior Publication Data

US 2021/0151828 A1 May 20, 2021

Related U.S. Application Data

(63) Continuation of application No. PCT/CN2019/113221, filed on Oct. 25, 2019.

(30) Foreign Application Priority Data

Oct. 30, 2018 (CN) .......................... 201821773716.5

(51) Int. Cl.
*H01M 50/204* (2021.01)
*H01M 50/24* (2021.01)
(Continued)

(52) U.S. Cl.
CPC .......... *H01M 50/204* (2021.01); *H01M 6/50* (2013.01); *H01M 10/425* (2013.01);
(Continued)

(58) Field of Classification Search
None
See application file for complete search history.

(56) References Cited

U.S. PATENT DOCUMENTS

2017/0125753 A1   5/2017   Kim

FOREIGN PATENT DOCUMENTS

| CN | 202231073 U | 5/2012 |
| CN | 204966568 U | 1/2016 |

(Continued)

OTHER PUBLICATIONS

Machine translation of German Patent Publication No. DE102017011717 (Year: 2017).*

(Continued)

*Primary Examiner* — Wyatt P McConnell
(74) *Attorney, Agent, or Firm* — Kilpatrick Townsend & Stockton (57) ABSTRACT

This application relates to the field of battery technologies, and provides a battery module and a manufacturing method thereof. The battery module includes: two or more battery groups, each battery group including two or more battery cells; a module frame, including end plates and side plates, wherein the end plates and the side plates form an accommodating cavity for fixing the battery groups; a middle plate, wherein the middle plate is disposed between two of the battery groups, and is provided with an accommodating groove inside; and a cell management unit, disposed in the accommodating groove of the middle plate and connected to a sampling line of the battery cells. A cell management unit in the accommodating groove inside the middle plate can reduce the chance from failing under swelling pressure of the battery cells.

17 Claims, 9 Drawing Sheets

(51) Int. Cl.
*H01M 50/289* (2021.01)
*H01M 10/42* (2006.01)
*H01M 6/50* (2006.01)

(52) U.S. Cl.
CPC ....... *H01M 10/4207* (2013.01); *H01M 50/24* (2021.01); *H01M 50/289* (2021.01); *H01M 2010/4271* (2013.01)

(56) References Cited

FOREIGN PATENT DOCUMENTS

| CN | 108520928 A | 9/2018 |
| CN | 209016218 U | 6/2019 |
| DE | 102017011717 A1 | 5/2018 |

OTHER PUBLICATIONS

Contemporary Amperex Technology Co., Limited, Extended European Search Report, EP19880246.4, dated Nov. 29, 2021, 12 pgs.
Contemporary Amperex Technology Co., Limited, International Search Report and Written Opinion, PCT/CN2019/113221, dated Jan. 2, 2020, 14 pgs.

\* cited by examiner

BATTERY MODULE AND MANUFACTURING METHOD THEREOF

CROSS-REFERENCE TO RELATED APPLICATIONS

This application is a continuation application of PCT Patent Application No. PCT/CN2019/113221, entitled "BATTERY MODULE AND MANUFACTURING METHOD" filed on Oct. 25, 2019, which claims priority to Chinese Patent Application No. 201821773716.5, filed with the State Intellectual Property Office of the People's Republic of China on Oct. 30, 2018, and entitled "BATTERY MODULE", all of which are incorporated herein by reference in their entirety.

TECHNICAL FIELD

This application relates to the field of battery technologies, and in particular, to a battery module and a manufacturing method thereof.

BACKGROUND

A battery module includes a plurality of battery cells. To monitor parameters such as a voltage and a temperature of each battery cell, a cell management unit is usually disposed in the battery module. In the prior art, the cell management unit is usually disposed on an end plate of the battery module, or is disposed together with a busbar on a harness separator above the battery cells.

The battery cells press against the end plate when swelling. Therefore, if the cell management unit is disposed on the end plate, there is a risk of the cell management unit being deformed and failing under pressure. In addition, the battery cells and the busbar produce much heat during operating. Therefore, if the cell management unit is disposed on the harness separator, there is a technical problem that the cell management unit is heated, resulting in a high temperature.

SUMMARY

Therefore, a novel battery module and a manufacturing method thereof need to be provided to resolve the foregoing prior-art technical problem that a cell management unit is vulnerable to a failure under pressure.

To achieve the foregoing objective, an aspect of this application provides a battery module, including:
  two or more battery groups, where each battery group includes two or more battery cells;
  a module frame, including end plates and side plates, where the end plates and the side plates form an accommodating cavity for fixing the battery groups;
  a middle plate, where the middle plate is disposed between two of the battery groups, and is provided with an accommodating groove inside; and
  a cell management unit, disposed in the accommodating groove of the middle plate and connected to a sampling line of the battery cells.

Further, the accommodating groove is recessed from the top to the bottom of the middle plate.

Further, positioning structures are provided on both sides of the accommodating groove, both sides of the cell management unit are in contact with the positioning structures, and gaps are left between first and second surfaces of the cell management unit and inner walls of the accommodating groove.

Further, the cell management unit includes a cell management circuit board and a housing, and the cell management circuit board is disposed in the housing.

Further, the housing is provided with fixing lugs, and the fixing lugs are fixed to the top of the middle plate by using fasteners.

Further, elastic pads are disposed at the bottom of the middle plate.

Further, grooves are provided on both sides at the bottom of the middle plate, and the top of the elastic pads is fixed in the grooves.

Further, the sampling line of the battery cells is connected to the top of the cell management unit.

Further, the bottom of the side plates is provided with L-shaped flanges, and the bottom of the battery cells is located on the L-shaped flanges.

Further, output electrodes of the battery module are disposed on an upper surface of the middle plate.

Another aspect of this application provides a battery module manufacturing method, where the manufacturing method includes:
  disposing a middle plate between two battery groups, where the middle plate is provided with an accommodating groove inside; and
  disposing a cell management unit in the accommodating groove of the middle plate.

Further, the manufacturing method further includes:
  connecting the cell management unit to a sampling line of battery cells.

Further, the manufacturing method further includes:
  disposing the battery groups in an accommodating cavity of a module frame.

Further, the disposing a cell management unit in the accommodating groove of the middle plate includes:
  disposing a cell management circuit board and a housing in the accommodating groove of the middle plate, and disposing the cell management circuit board in the housing.

Further, the housing is provided with fixing lugs, and the manufacturing method further includes:
  fixing the fixing lugs to the top of the middle plate.

Unlike the prior art, the foregoing technical solutions include two or more battery groups, with a middle plate disposed between two of the battery groups, and a cell management unit is disposed in the accommodating groove inside the middle plate, preventing the cell management unit from failing under swelling pressure of the battery cells. In addition, disposing the cell management unit in the middle plate can also prevent over-temperature caused by heating of the battery cells and the busbar, thereby greatly improving reliability of the cell management unit.

Reference numerals in the accompanying drawings are described as follows:

1. module frame;
    11. end plate;
    12. side plate;
        121. flange;
    13. cover plate;
2. middle plate;
    21. accommodating groove;
        211. positioning structure;
3. cell management unit;
    31. cell management circuit board;
    32. housing;
        321. fixing lug;
        322. groove;
    33. elastic pad;
4. battery group;
    41. battery cell;
    42. negative output electrode;
    43. positive output electrode;
5. sampling line;
6. separator; and
7. bolt.

The accompanying drawings herein are incorporated into and constitute a part of the specification. They show embodiments that conform to this application, and are used in combination with the specification to explain rationale of this application.

DESCRIPTION OF EMBODIMENTS

To describe in detail the technical content, structural features, and intended objectives and effects of the technical solutions, the following provides detailed descriptions with reference to specific embodiments and accompanying drawings.

Referring to FIG. 1 to FIG. 9, an embodiment provides a battery module.

Figure 1:
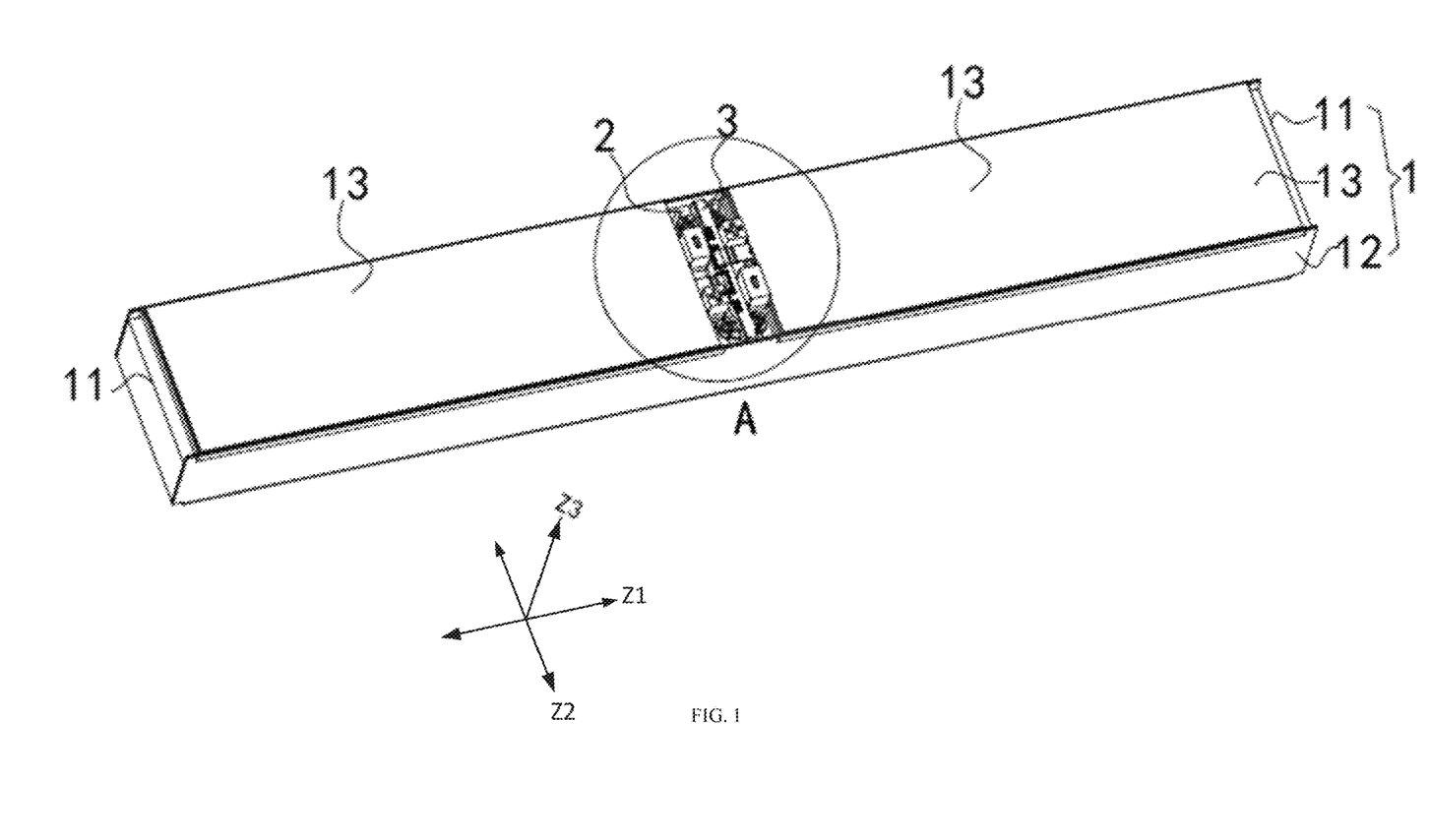
FIG. 1 is a schematic structural diagram of a battery module according to a specific embodiment.
Figure 2:
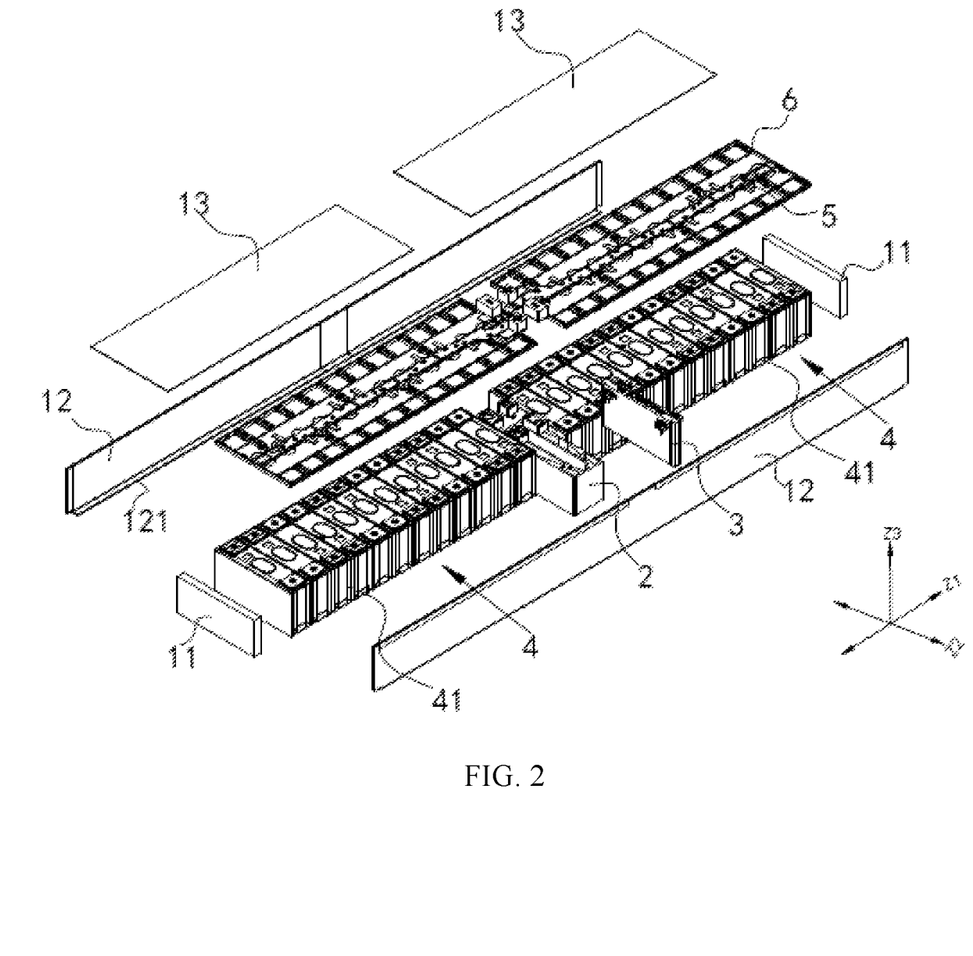
FIG. 2 is an exploded diagram of a battery module according to a specific embodiment.

As shown in FIG. 1 and FIG. 2, the battery module includes a module frame 1, two or more battery groups 4, a middle plate 2, and a cell management unit 3.

The battery group 4 includes two or more battery cells 41 arranged in order, and two adjacent battery cells 41 are disposed with large faces of their housings facing each other. The battery cells 41 are energy storage units of the battery module, and are configured to store electrical energy and provide electrical energy to the outside. The battery cells 41 in the battery group 4 may be connected in series or parallel, and each battery group 4 may be provided with a positive output electrode and a negative output electrode. When the battery group 4 includes a plurality of battery cells 41, the battery group 4 may form a cuboid structure in which large faces of the housings of the battery cells 41 face both ends. In a coordinate system in FIG. 1, Z1 is an X-axis, that is, a length direction; Z2 is a Y-axis, that is, a width direction; and Z3 is a Z-axis, that is, a height direction.

The module frame 1 includes two oppositely disposed end plates 11 and two oppositely disposed side plates 12. The end plates 11 and the side plates 12 are connected to each other end to end to form an accommodating cavity for accommodating the battery groups 4 (that is, a position at which the battery groups 4 are placed). The module frame 1 can serve a purpose of fixing and protecting the battery groups 4 to prevent the battery groups 4 and the battery cells 41 from being displaced or being hit or scratched by an external object. The module frame 1 may be formed by connecting metal sheets such as aluminum alloy or steel sheets. As shown in FIG. 1 and FIG. 2, the module frame 1 may further include cover plates 13. The cover plates 13 are disposed above the battery groups 4 and serve a purpose of protection at the top.

As shown in FIG. 2, at least two battery groups 4 can be accommodated in the accommodating cavity for the battery groups 4, and the two battery groups 4 are disposed in order along the length direction. The middle plate 2 is disposed between the two battery groups 4. Two large faces of the middle plate 2 each are opposite to an end face of each of the two battery groups 4. The other end face of each of the two battery groups 4 is opposite to one of the two end plates 11. The end plates 11 on the one hand can limit positions of the battery groups 4 and the battery cells 41, and on the other hand can absorb stress produced when the battery cells 41 swell, to prevent the battery cells 41 from breaking due to swelling. Here, an end of the module frame is an end in a length direction of the module frame.

The middle plate 2 is disposed between the two end plates 11 and in parallel to the end plates 11, and the middle plate 2 is provided with an accommodating groove 21 inside. The middle plate 2 may be disposed at a middle position between the two end plates 11, or at a non-middle position between the two end plates 11, that is, distances between the middle plate 2 and the two end plates 11 may be unequal. The middle plate 2 may be made of a metal material or another hard material. The cell management unit 3 is disposed in the accommodating groove 21 of the middle plate 2, and the cell management unit 3 is connected to a sampling line 5 of the battery cells 41 to collect data such as temperature and voltage of the battery cells 41.

The cell management unit 3 is configured to collect the data such as voltage and temperature of the battery cells 41, and send the collected data to a cell management system outside the battery module. The cell management unit 3 is disposed in the accommodating groove 21 of the middle plate 2, and the cell management unit 3 is connected to the sampling line 5 of the battery cells 41. The sampling line 5 may be electrically connected to poles of the battery cells 41 to collect the voltage data of the battery cells. Further, the sampling line 5 may be connected to a temperature sensor, and the temperature sensor may be in contact with the housings or the poles of the battery cells 41 to collect the temperature data of the battery cells 41.

The accommodating groove 21 inside the middle plate 2 is a slot or a cavity that is able to accommodate the cell management unit 3 and that is formed by partially hollowing out the middle plate 2. The accommodating groove 21 only needs to be able to accommodate the cell management unit 3 and make surfaces of the cell management unit 3 not exceed front and rear large faces of the middle plate 2.

The accommodating groove 21 is provided inside the middle plate 2, and the surfaces of the cell management unit 3 do not exceed the front and rear large faces of the middle plate 2, so that the cell management unit 3 is not in contact with end faces of the battery groups 4. Therefore, pressure produced when the battery cells 41 swell directly acts on the middle plate 2 without acting on the cell management unit 3, thereby preventing the cell management unit 3 from being deformed and failing under the swelling pressure of the battery cells 41. Because the middle plate 2 is located between two battery groups 4, its temperature is lower than that above the battery cells 41, avoiding over-temperature of the cell management unit 3.

As shown in FIG. 2, a separator 6 may be disposed at the top of the battery groups 4, and the sampling line 5 of the battery cells 41 may be a flexible circuit board, and disposed on an upper surface of the separator 6 at the top of the battery groups 4. The flexible circuit board is also referred to as an FPC, and has advantages such as being thin and bendable. Therefore, it essentially does not occupy space at the top of the battery module, facilitating an energy density of the battery module. In addition, the flexible circuit board being bendable also facilitates wiring of the sampling line 5.

Figure 3:
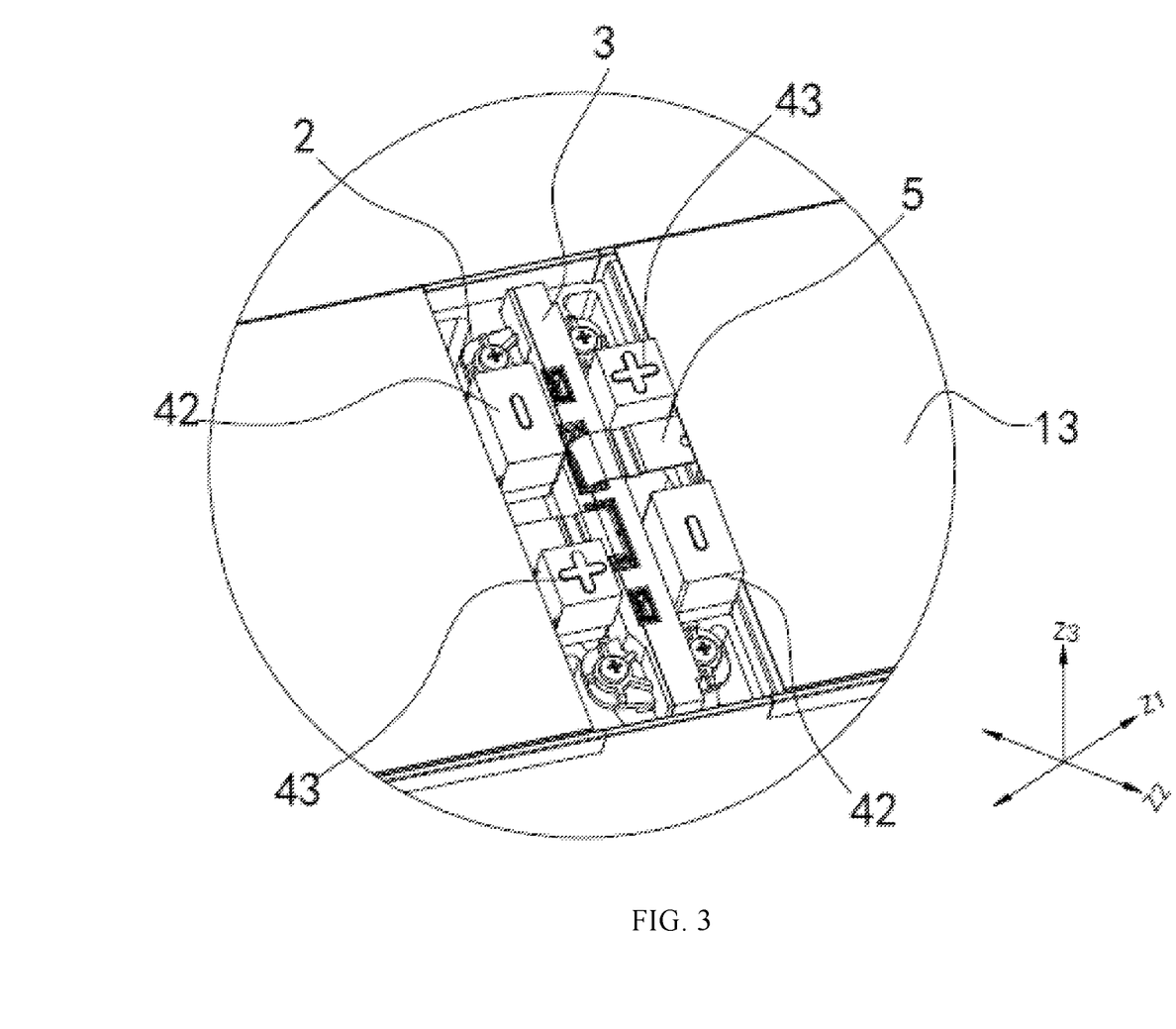
FIG. 3 is a locally enlarged view of part A in FIG. 1.
Figure 4:
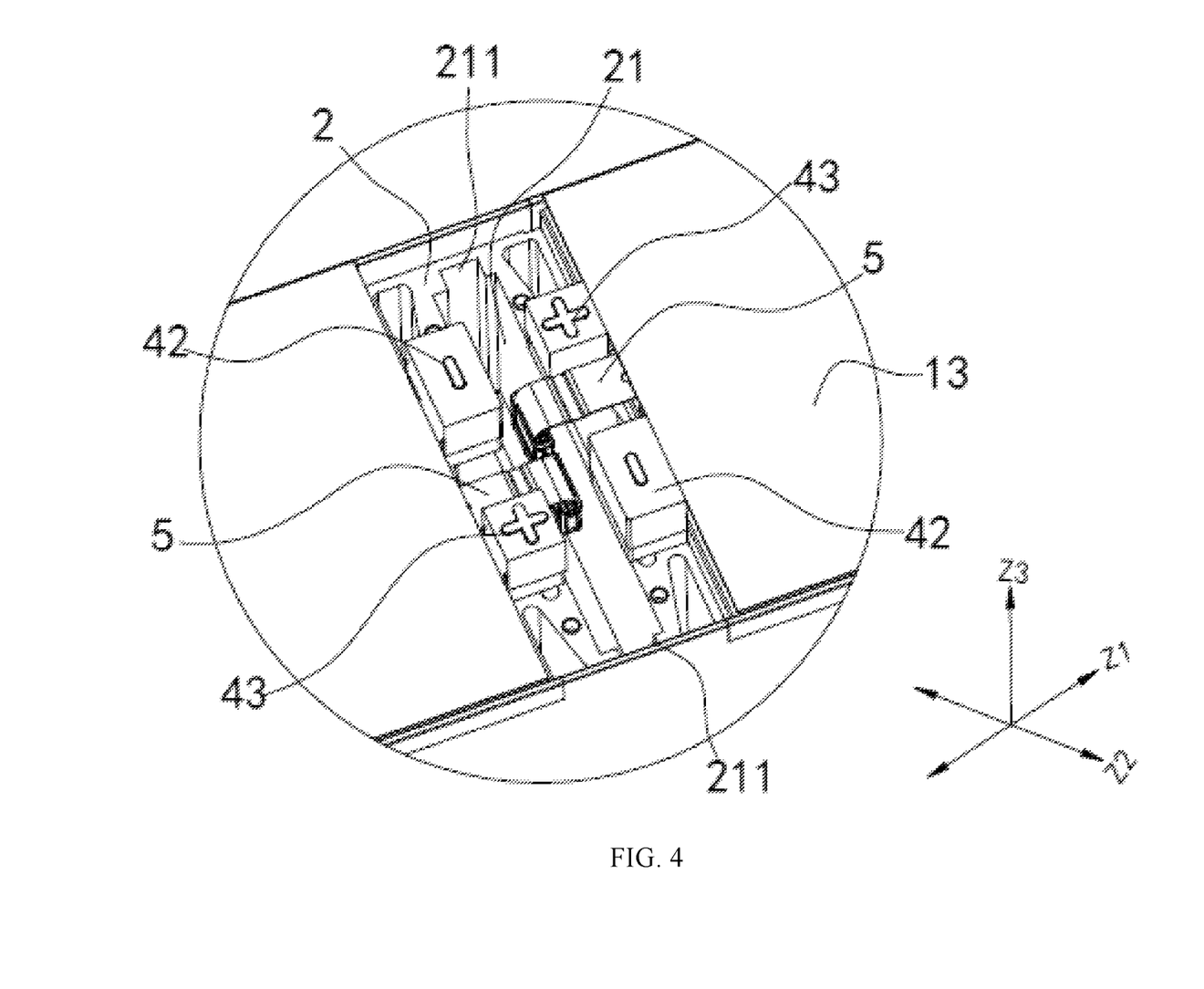
FIG. 4 is a schematic diagram where no cell management unit is disposed in FIG. 3.

As shown in FIG. 3 and FIG. 4, the accommodating groove 21 inside the middle plate 2 may be recessed from the top to the bottom of the middle plate 2, that is, an opening of the accommodating groove 21 is provided at the top of the middle plate 2, and the cell management unit 3 is inserted into the accommodating groove 21 from the top of the middle plate 2. In addition, a socket between the cell management unit 3 and the sampling line 5 may also be provided at the top of the cell management unit 3. Such a structure of the accommodating groove 21 on the one hand facilitates installation and uninstallation of the cell management unit 3, and also facilitates connection between the sampling line 5 and the cell management unit 3; and on the other hand separates the cell management unit 3 from the end faces of the battery groups 4, so that swelling pressure and temperature of the battery groups 4 do not directly act on the cell management unit 3 (this achieves better heat insulation and anti-swelling performance compared with a case in which the opening of the accommodating groove 21 is provided on a side face of the middle plate 2).

As shown in FIG. 3 and FIG. 4, output electrodes of the battery module may be disposed on an upper surface of the middle plate 2. A positive output electrode 43 and a negative output electrode 42 are disposed on both sides at the top of the middle plate 2. The positive output electrode 43 and the negative output electrode 42 on either side of the middle plate 2 are output electrodes of a battery group 4 on the corresponding side. The positive output electrode 43 and the negative output electrode 42 are correspondingly connected to a positive output pole and a negative output pole of the battery group 4. Disposing the output electrodes at the top of the middle plate 2 can make full use of space in the middle of the battery module, save room at both ends of the battery module, and help improve the energy density of the battery module.

As shown in FIG. 4 to FIG. 7, positioning structures 211 are provided on both sides of the accommodating groove 21. The positioning structures 211 are in contact with both sides of the cell management unit 3, to fix a position of the cell management unit 3 in the accommodating groove 21, so that the cell management unit 3 does not shake in the accommodating groove 21. In particular, the cell management unit 3 is restricted from shaking in a thickness direction of the accommodating groove 21 (that is, the direction of the Z1-axis in the figure), so that gaps are left between first and second surfaces of the cell management unit 3 and inner walls of the accommodating groove 21.

In different embodiments, the positioning structures 211 have different structural forms. As shown in FIG. 4, the positioning structures 211 are groove-shaped structures. To be specific, other grooves are provided on left and right sides of the accommodating groove 21 (that is, positions indicated by 211), and widths of the grooves are equivalent to a thickness of the cell management unit 3, so that both sides of the cell management unit 3 can be stably stuck in the grooves without shaking. In addition, the widths of the grooves are less than a width of the accommodating groove 21, so that gaps are left between the first and second surfaces of the cell management unit 3 and the inner walls of the accommodating groove 21. The gap is at least 1 mm.

The positioning structures 211 are provided in the accommodating groove 21, so that gaps are left between the first and second surfaces of the cell management unit 3 and the inner walls of the accommodating groove 21. This reserves space for deformation of the middle plate 2 caused by swelling of the battery cells 41, so that the middle plate 2 does not press against the cell management unit 3. In addition, the positioning structures 211 also serve a guiding purpose. During installation of the cell management unit 3, the cell management unit 3 may be inserted into the accommodating groove 21 along the positioning structures 211, and a position of the cell management unit 3 does not need to be adjusted after the insertion.

In another embodiment, the positioning structures 211 may be structures such as positioning posts or positioning blocks. The positioning posts or positioning blocks may be provided in pairs on the left and right sides of the accommodating groove 21, and a spacing between the positioning posts or positioning blocks provided in pairs is equivalent to the thickness of the cell management unit 3, so that ends of the positioning posts or the positioning blocks exactly press against two large faces of the cell management unit 3, fixing the cell management unit 3 in the accommodating groove 21.

Figure 8:
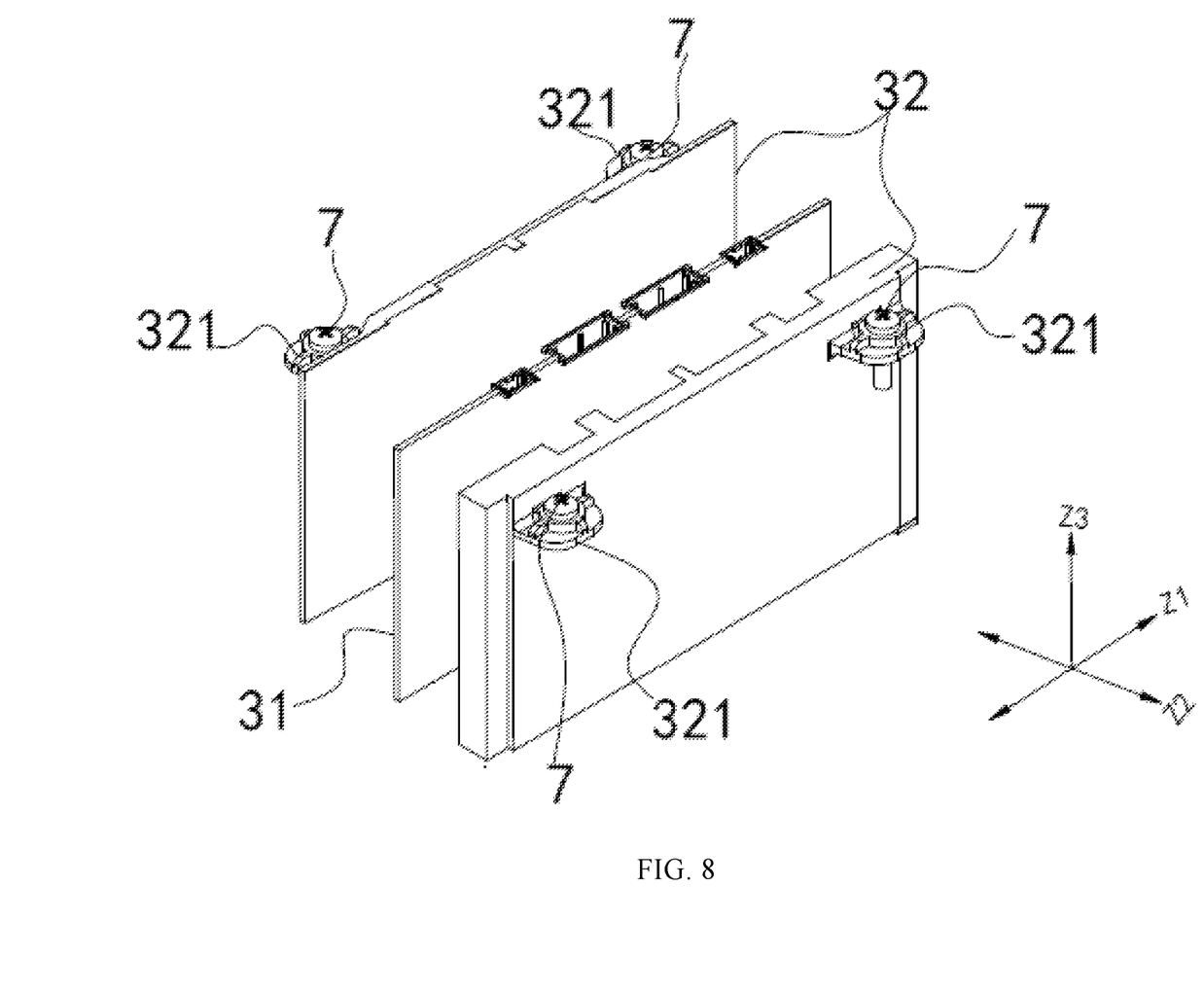
FIG. 8 is an exploded diagram of a cell management unit according to a specific embodiment.

As shown in FIG. 8, the cell management unit 3 may include a cell management circuit board 31 and a housing 32, and the cell management circuit board 31 is disposed in the housing 32. The housing 32 includes a front cover and a rear cover, and the front cover and the rear cover jointly form a cavity for accommodating the cell management circuit board 31. The cell management circuit board 31 is disposed in the cavity formed by the front cover and the rear cover. The housing 32 can protect the cell management circuit board 31, and can prevent the cell management circuit board 31 from getting in contact with the middle plate 2 to cause a failure such as a short circuit.

The housing 32 is further provided with fixing lugs 321, and the fixing lugs 321 are fixed to the top of the middle plate 2 by using fasteners such as bolts 7. The fixing lugs 321 can fix the cell management unit 3 to the middle plate 2 to prevent the cell management unit 3 from moving up and down in the accommodating groove 21 in a vertical direction.

Figure 5:
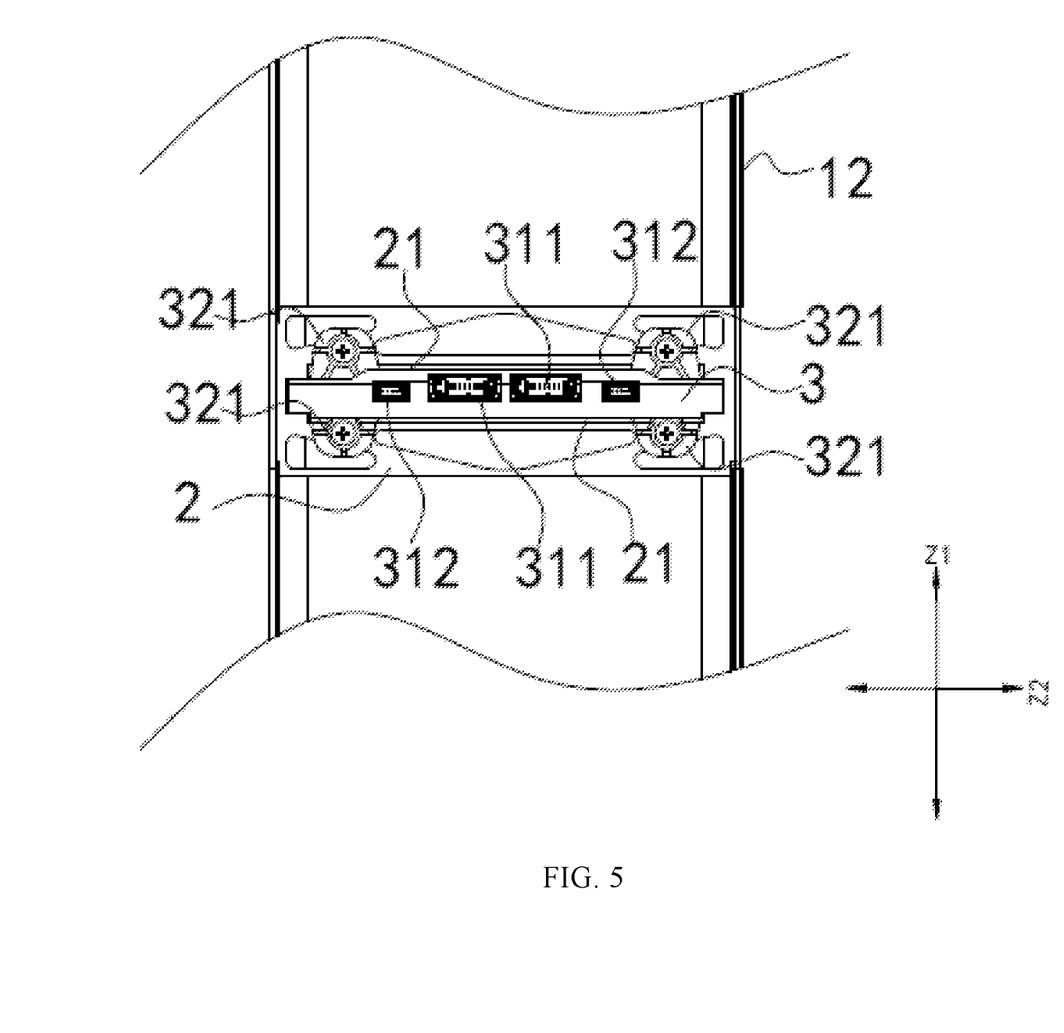
FIG. 5 is a top view with a cell management unit and a middle plate installed according to a specific embodiment.

In an embodiment shown in FIG. 5, there are four fixing lugs 321, and the four fixing lugs 321 are disposed on the upper middle of two large faces of the housing 32, and protrude from surfaces of the two large faces of the housing 32. Certainly, in other embodiments, there may be two or three, or other quantities of fixing lugs 321, and the fixing lugs 321 may be directly disposed on a top face of the housing 32 and protrude towards a side face.

Figure 6:
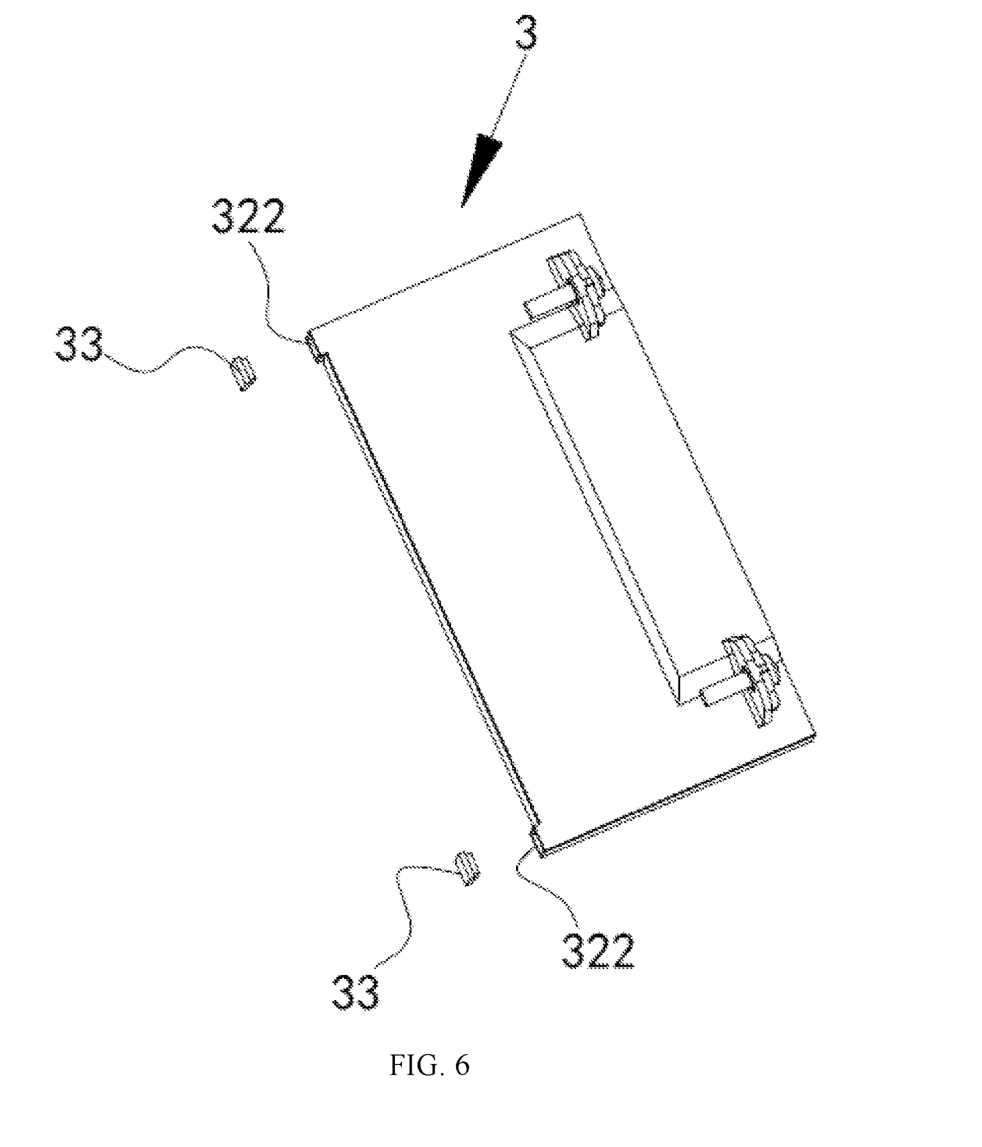
FIG. 6 is a schematic diagram illustrating how elastic pads are installed onto a cell management unit according to a specific embodiment.
Figure 7:
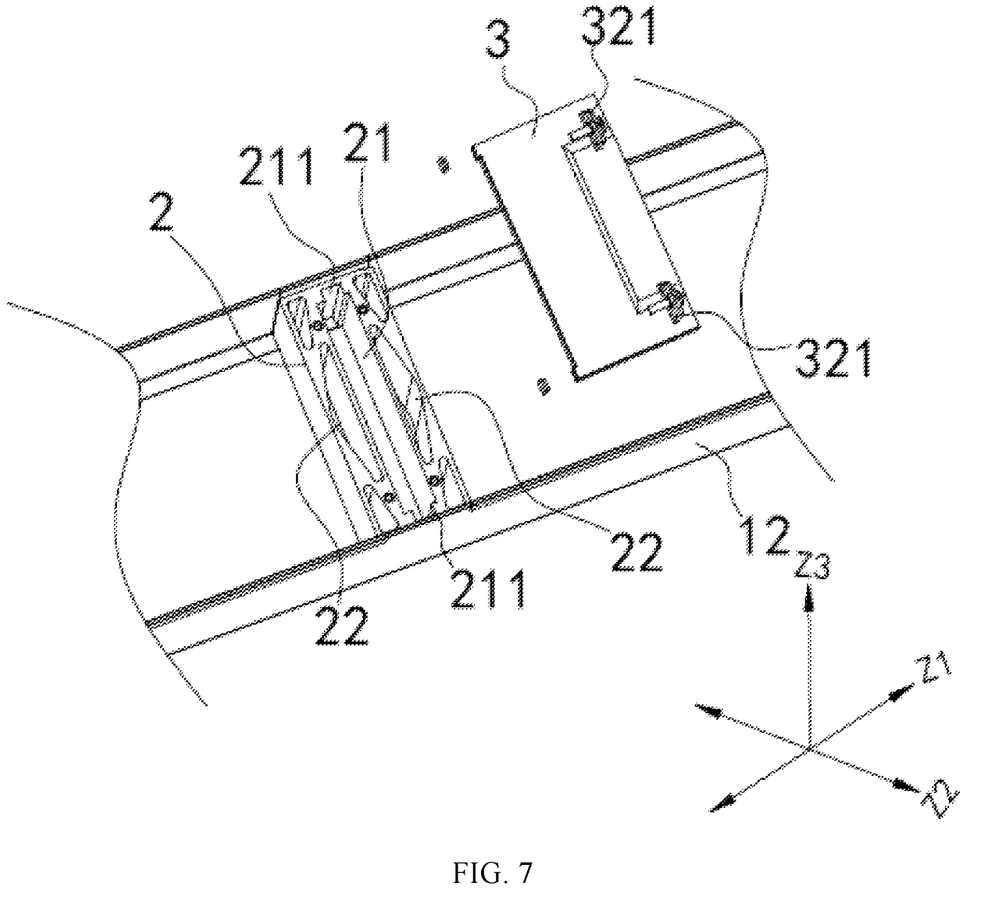
FIG. 7 is a schematic diagram illustrating how a cell management unit is installed into a middle plate according to a specific embodiment.

As shown in FIG. 6, elastic pads 33 are disposed at the bottom of the middle plate 2, and the elastic pads 33 may be made of an elastic material such as rubber or silicone. There may be two elastic pads 33, which are separately disposed on two sides at the bottom of the housing 32. The cell management unit 3 is in contact with the bottom of the battery module through the elastic pads 33. When the bolts 7 lock the cell management unit 3, the cell management unit 3 moves down to make the elastic pads 33 press against the bottom of the battery module. Thereby, an installation error of the cell management unit 3 in the vertical direction can be eliminated.

To facilitate installation of the elastic pads 33, grooves 322 are provided on both sides at the bottom of the housing 32, and the top of the elastic pads 33 is fixed in the grooves 322, so that the elastic pads 33 are fixed to the bottom of the housing 32. The grooves 322 can ensure connection strength of the elastic pads 33 to prevent them from falling off. Certainly, in other embodiments, there may be more than three elastic pads 33, and the elastic pads 33 may be further fixed to the bottom of the housing 32 in another manner such as gluing or bolting.

Figure 9:
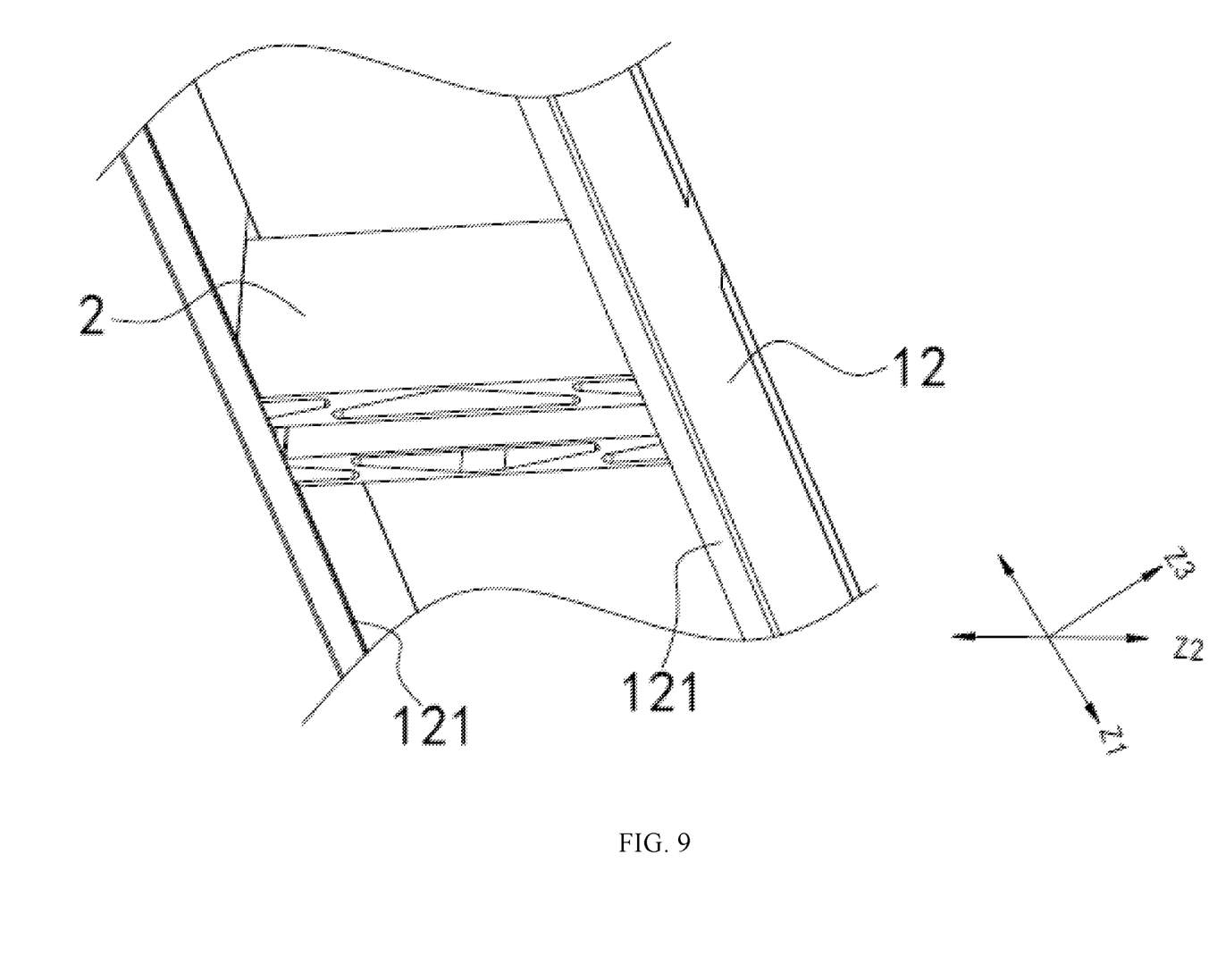
FIG. 9 is a schematic diagram (a bottom view) illustrating how side plates are connected to a middle plate according to a specific embodiment.

As shown in FIG. 9, in an embodiment, the bottom of the side plates 12 is provided with L-shaped flanges 121, and the L-shaped flanges 121 may be formed by bending the bottom of the side plates 12 in an inward direction (that is, a direction in which the battery cells 41 are located). The L-shaped flanges 121 are bent inward, so that the bottom of the battery cells 41 and the middle plate 2 may be located on an upper surface of the L-shaped flanges 121, thereby limiting a position of the bottom of the battery cells 41 and the middle plate 2.

An embodiment of this application further provides a battery module manufacturing method, including:
 disposing a middle plate 2 between two battery groups 4, where the middle plate 2 is provided with an accommodating groove inside; and
 disposing a cell management unit 3 in the accommodating groove 21 of the middle plate 2.

Further, the manufacturing method further includes:
 connecting the cell management unit 3 to a sampling line 5 of battery cells 41.

Further, the manufacturing method further includes:
 disposing the battery groups 4 in an accommodating cavity of a module frame 1.

The disposing a cell management unit 3 in the accommodating groove 21 of the middle plate 2 includes:
 disposing a cell management circuit board 31 and a housing 32 in the accommodating groove 21 of the middle plate 2, and disposing the cell management circuit board 31 in the housing 32.

Further, the housing 32 is provided with fixing lugs 321, and the manufacturing method further includes:
 fixing the fixing lugs 321 to the top of the middle plate 2.

It should be noted that, in the descriptions of this application, unless otherwise specified and defined explicitly, the terms "first" and "second" are merely intended for a purpose of description, and should not be understood as an indication or implication of relative importance, and the terms "connection" and "fixing" should be understood in their general senses. For example, the "connection" may be a fixed connection, a detachable connection, an integrated connection, or an electrical connection; or may be a direct connection, or an indirect connection through an intermediate medium. A person of ordinary skill in the art can understand specific meanings of the foregoing terms in this application according to a specific situation.

In the descriptions of the specification, it should be understood that the directional terms such as "up", "down", "left", and "right" described in the embodiments of this application are described as seen from the angles shown in the accompanying drawings, and should not be understood as a limitation to the embodiments of this application In addition, in the context, it should be further understood that when an element is referred to as being "above" or "under" another element, the element can not only be directly connected "above" or "under" the another element, but also be indirectly connected "above" or "under" the another element through an intermediate element.

What is claimed is:

1. A battery module, comprising:
 two or more battery groups, wherein each battery group comprises two or more battery cells;
 a module frame, comprising end plates and side plates, wherein the end plates and the side plates form an accommodating cavity for fixing the battery groups;
 a middle plate, wherein the middle plate is disposed between two of the battery groups, and is provided with an accommodating groove inside; and
 a cell management unit, disposed in the accommodating groove of the middle plate and connected to a sampling line of the battery cells, wherein the cell management unit is arranged not in contact with the two or more battery groups.

2. The battery module according to claim 1, wherein the accommodating groove is recessed from a top of the middle plate to a bottom of the middle plate.

3. The battery module according to claim 2, wherein positioning structures are provided on both sides of the accommodating groove, both sides of the cell management unit are in contact with the positioning structures, and there are gaps between first and second surfaces of the cell management unit and corresponding inner walls of the accommodating groove.

4. The battery module according to claim 1, wherein the cell management unit comprises a cell management circuit board and a housing, and the cell management circuit board is disposed in the housing.

5. The battery module according to claim 4, wherein the housing is provided with fixing lugs, and the fixing lugs are fixed to the top of the middle plate by using fasteners.

6. The battery module according to claim 1, wherein elastic pads are disposed at a bottom of the middle plate.

7. The battery module according to claim 6, wherein grooves are provided on both sides at the bottom of the middle plate, and tops of the elastic pads are fixed in the grooves.

8. The battery module according to claim 1, wherein the sampling line of the battery cells is connected to a top of the cell management unit.

9. The battery module according to claim 1, wherein bottoms of the side plates are provided with L-shaped flanges, and bottoms of the battery cells are located on the L-shaped flanges.

10. The battery module according to claim 1, wherein output electrodes of the battery module are disposed on an upper surface of the middle plate.

11. A battery module manufacturing method, comprising:
 disposing a middle plate between two battery groups, wherein the middle plate is provided with an accommodating groove inside; and
 disposing a cell management unit in the accommodating groove of the middle plate, wherein the cell management unit comprises a housing and a cell management circuit board disposed in the housing, and the housing is provided with fixing lugs; and
 fixing the fixing lugs to a top of the middle plate.

12. The manufacturing method according to claim 11, further comprising:
connecting the cell management unit to a sampling line of battery cells.

13. The manufacturing method according to claim 11, further comprising:
disposing the battery groups and the middle plate in an accommodating cavity defined by a module frame.

14. A battery module, comprising:
two or more battery groups, wherein each battery group comprises two or more battery cells;
a module frame, comprising end plates and side plates, wherein the end plates and the side plates form an accommodating cavity for fixing the battery groups;
a middle plate, wherein the middle plate is disposed between two of the battery groups, and is provided with an accommodating groove inside; and
a cell management unit, disposed in the accommodating groove of the middle plate and connected to a sampling line of the battery cells,
wherein the cell management unit comprises a cell management circuit board and a housing, and the cell management circuit board is disposed in the housing; and
wherein the housing is provided with fixing lugs, and the fixing lugs are fixed to the top of the middle plate by using fasteners.

15. The battery module according to claim 14, wherein elastic pads are disposed at a bottom of the middle plate.

16. The battery module according to claim 15, wherein grooves are provided on both sides at the bottom of the middle plate, and tops of the elastic pads are fixed in the grooves.

17. The manufacturing method according to claim 11, wherein the cell management unit is arranged to be not in contact with the two battery groups.

* * * * *